United States Patent
Engelgau (10) Patent No.: US 12,030,650 B2
(45) Date of Patent: Jul. 9, 2024

(54) AUTOMATIC PARACHUTE RELEASE DEVICE

(71) Applicant: Fruity Chutes Inc, Monte Sereno, CA (US)

(72) Inventor: Eugene Engelgau, Monte Sereno, CA (US)

(*) Notice: Subject to any disclaimer, the term of this patent is extended or adjusted under 35 U.S.C. 154(b) by 551 days.

(21) Appl. No.: 17/403,648

(22) Filed: Aug. 16, 2021

(65) Prior Publication Data
US 2022/0048638 A1  Feb. 17, 2022

Related U.S. Application Data

(60) Provisional application No. 63/065,947, filed on Aug. 14, 2020.

(51) Int. Cl.
*B64D 17/38* (2006.01)
(52) U.S. Cl.
CPC ................. *B64D 17/383* (2013.01)
(58) Field of Classification Search
CPC .... B64D 17/383; B64D 17/38; B64D 17/386; B64D 17/30
USPC ....................................... 294/82.25
See application file for complete search history.

(56) References Cited

U.S. PATENT DOCUMENTS

| | | | |
|---|---|---|---|
| 2,422,839 A | 6/1947 | Maskey | |
| 2,490,558 A | 12/1949 | Sullivan | |
| 2,616,748 A | 11/1952 | Hight | |
| 2,732,245 A | 1/1956 | Lemoigne | |
| 2,831,721 A | 4/1958 | Reinhold | |
| 2,919,154 A | 12/1959 | Ludwig | |
| 2,949,330 A * | 8/1960 | Walton | B64D 17/383 294/82.25 |
| 3,066,632 A * | 12/1962 | Bemis | F42B 10/56 294/82.28 |
| 3,081,122 A * | 3/1963 | Jungersen | B64D 17/383 294/90 |
| 3,430,305 A * | 3/1969 | Geffner | B64D 17/383 294/82.28 |
| 3,829,146 A * | 8/1974 | Laswell | B64D 17/383 294/82.25 |
| 4,132,147 A * | 1/1979 | Contaldo | B64D 7/08 294/86.25 |

(Continued)

FOREIGN PATENT DOCUMENTS

AU            697603 B2    10/1998

*Primary Examiner* — Paul T Chin (57) ABSTRACT

An automatic parachute release device is a quick release coupler that becomes disengaged after an externally applied tension load is removed. The parachute release device has a parachute connection fastener, a camlock mechanism, a retention mechanism and a catch pin. The camlock mechanism is a mechanical controller that transitions the retention mechanism between a set configuration and a release configuration. While in the set configuration, the retention device is clamped around the catch pin. While in the release configuration, the retention mechanism disengages the catch pin. Thus, the retentive capabilities of the retention mechanism are governed by the configuration of the camlock mechanism. The retention mechanism remains in the set configuration until the load is removed. At which point, the retention mechanism slides into a dedicated slot of the camlock mechanism and becomes disengaged.

12 Claims, 9 Drawing Sheets

(56) References Cited

U.S. PATENT DOCUMENTS

| | | | | |
|---|---|---|---|---|
| 5,687,931 A | * | 11/1997 | Hogan | B64D 17/383 |
| | | | | 294/82.25 |
| 6,024,326 A | * | 2/2000 | Godfrey | B64D 17/383 |
| | | | | 244/151 B |
| 6,390,722 B1 | * | 5/2002 | Godfrey | F16B 21/165 |
| | | | | 294/82.28 |

* cited by examiner

AUTOMATIC PARACHUTE RELEASE DEVICE

The current application claims a priority to the U.S. Provisional Patent application Ser. No. 63/065,947 filed on Aug. 14, 2020. The current application is filed on Aug. 16, 2021 while Aug. 14, 2021 was on a weekend.

FIELD OF THE INVENTION

The present invention relates generally to quick-release devices. More specifically, the present invention is a device that automatically release the load from a parachute upon landing.

BACKGROUND OF THE INVENTION

Parachutes are a reliable way of allowing a payload or a person to descend from the air to the ground at a safe speed. There are many existing devices used with parachutes in order to assist in the release of a payload or a person upon landing. However, a potential problem may appear upon landing due to unpredictable factors which can lead to the parachute to being caught by the wind and dragging the payload or the person across the landing surface. The unnecessary drag upon landing can cause a great deal in damage to the payload and if not acted on, the payload can potentially be dragged for extended distances away from the anticipated landing spot.

An objective of the present invention is a device used to release a payload or a person from a parachute upon landing. In addition, the present invention automatically releases a payload or a person from a parachute upon landing. The present invention is located between the parachute riser cord and a payload or a person. The present invention has two different configurations: a hold position and a release position. Furthermore, the present invention has a time-delay for releasing a payload or a person from the parachute upon landing to ensure the device is not released preemptively or delayed.

DETAIL DESCRIPTIONS OF THE INVENTION

All illustrations of the drawings are for the purpose of describing selected versions of the present invention and are not intended to limit the scope of the present invention.

Referring to FIG. 1 through FIG. 9, the preferred embodiment of the present invention is an automatic parachute release device. The present invention provides a quick-release mechanism that couples a user's harness to the straps of a parachute while under load and then decouples the harness and parachute once the load is removed. This system enables the user to remain attached to the parachute while descending and then prevents the user or payload from being pulled along by wind that catches the parachute after the user is safely on the ground. To achieve the above-described functionality, the present invention comprises a parachute-connection fastener 1, a camlock mechanism 2, a retention mechanism 3, and a catch pin 4. The present invention is designed to provide a linear connection fastener where the parachute-connection fastener 1 is a coupling device that enables the present invention to be attached to external structures, including, but not limited to, straps, ropes, and chains. The camlock=mechanism 2 is an automatic control system that rotates to transition the retention mechanism 3 between a set configuration and a release configuration. The retention mechanism 3 is a linear locking device that prevents the catch pin 4 from becoming detached from the parachute-connection fastener 1 while in the set configuration. Additionally, the retention mechanism 3 enables the catch pin 4 to become detached from the parachute-connection fastener 1 while in the release configuration. The catch pin 4 is a fastening device similar to the parachute connection fastener and enables the present invention to be connected to external structures, including but not limited to, harnesses, straps, cables, and chains.

Figure 1:
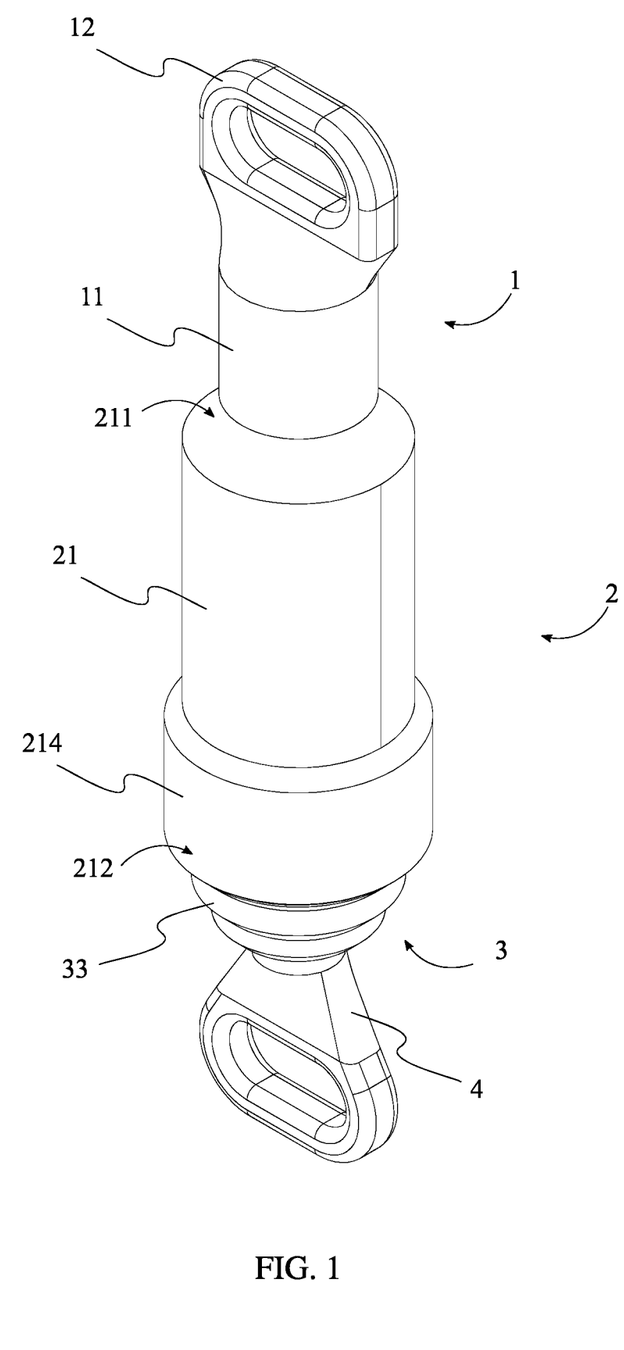
FIG. 1 is an isometric view of the present invention.
Figure 2:
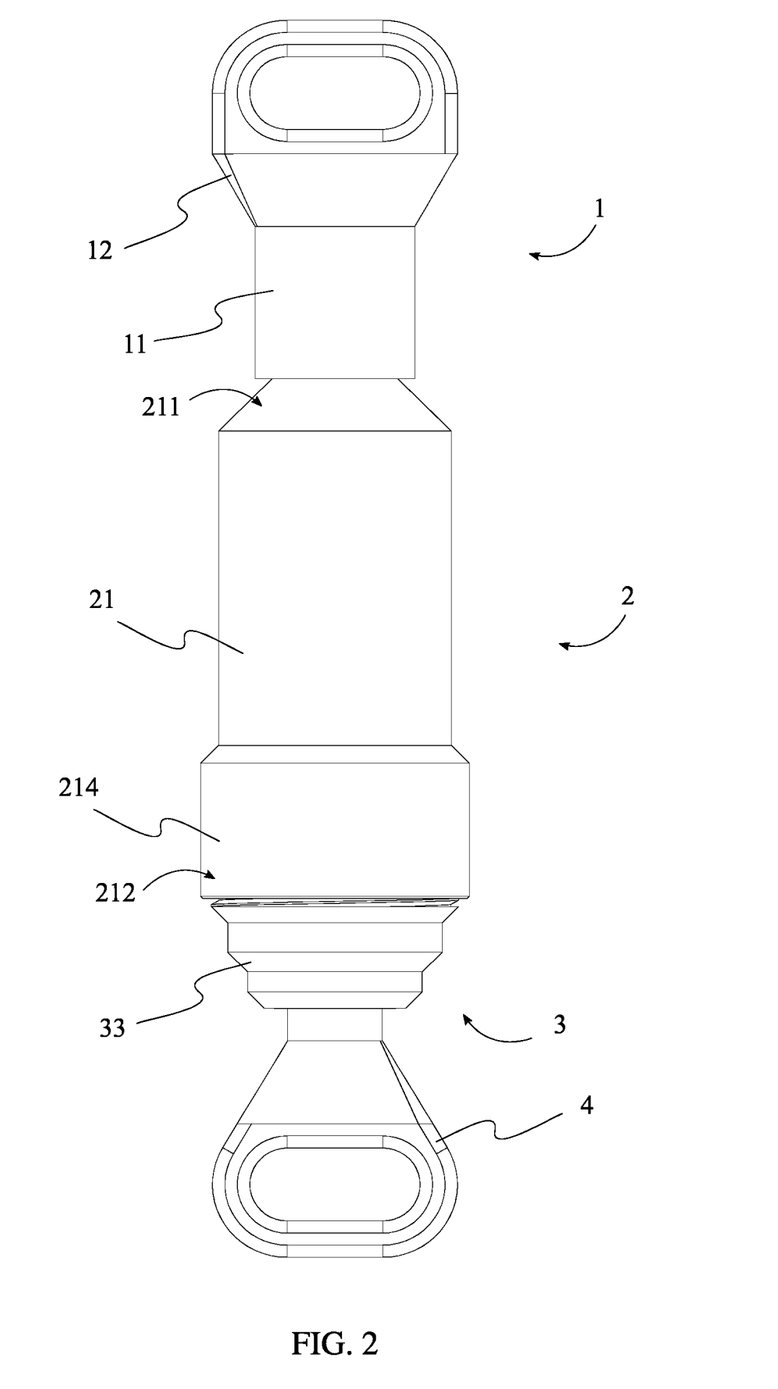
FIG. 2 is a front view of the present invention.
Figure 3:
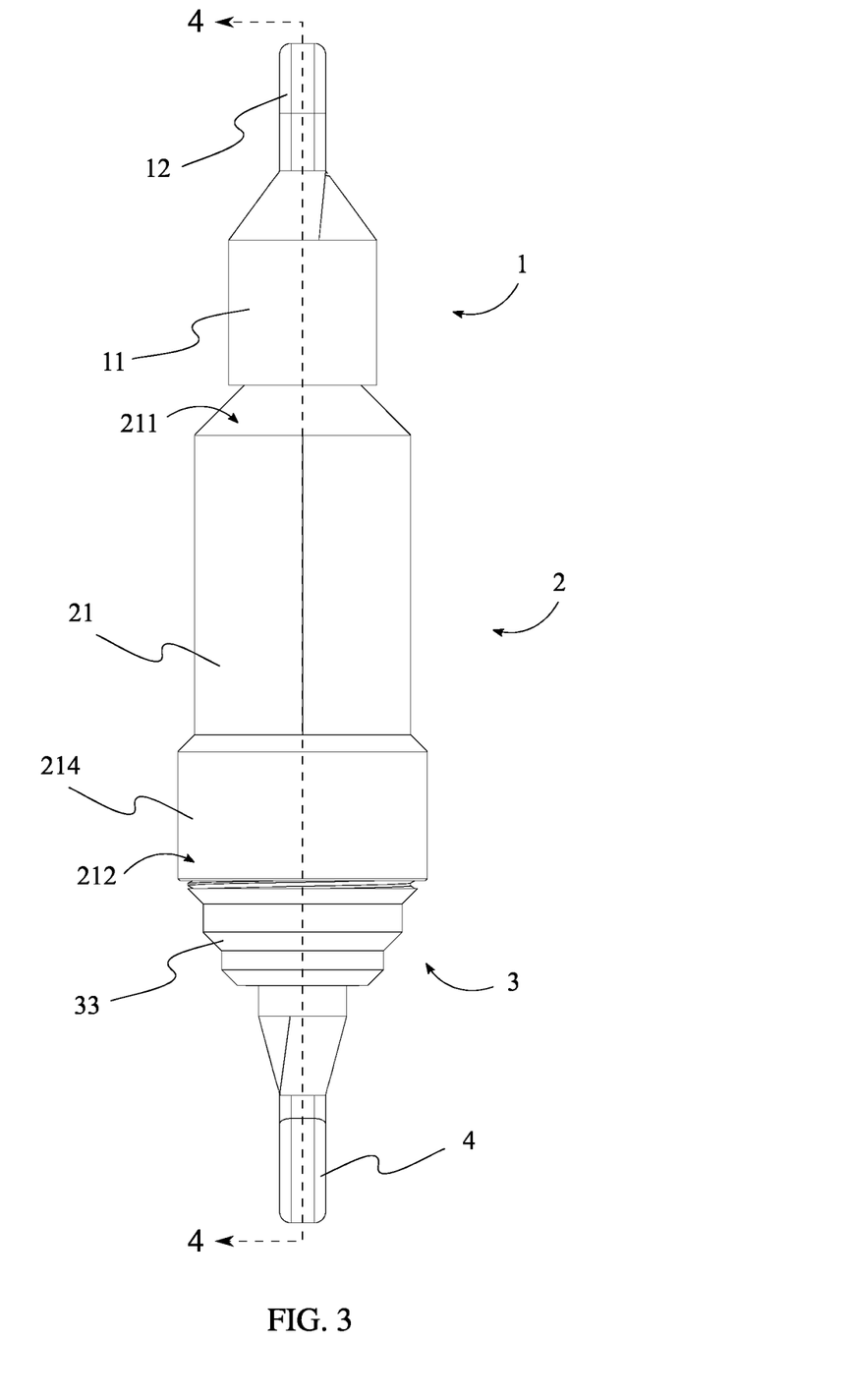
FIG. 3 is a side view of the present invention indicating the direction of section cut 4.

Referring to FIG. 1, prior to use, the present invention is maintained in the set configuration. In the set configuration, the parachute-connection fastener 1 and the catch pin 4 have not been subjected to tension forces required to support the user while tethered to the parachute. Additionally, the camlock mechanism 2 forces the retention mechanism 3 to clamp around the catch pin 4 and forms a semipermanent connection between the parachute strap and the user's harness.

Figure 4:
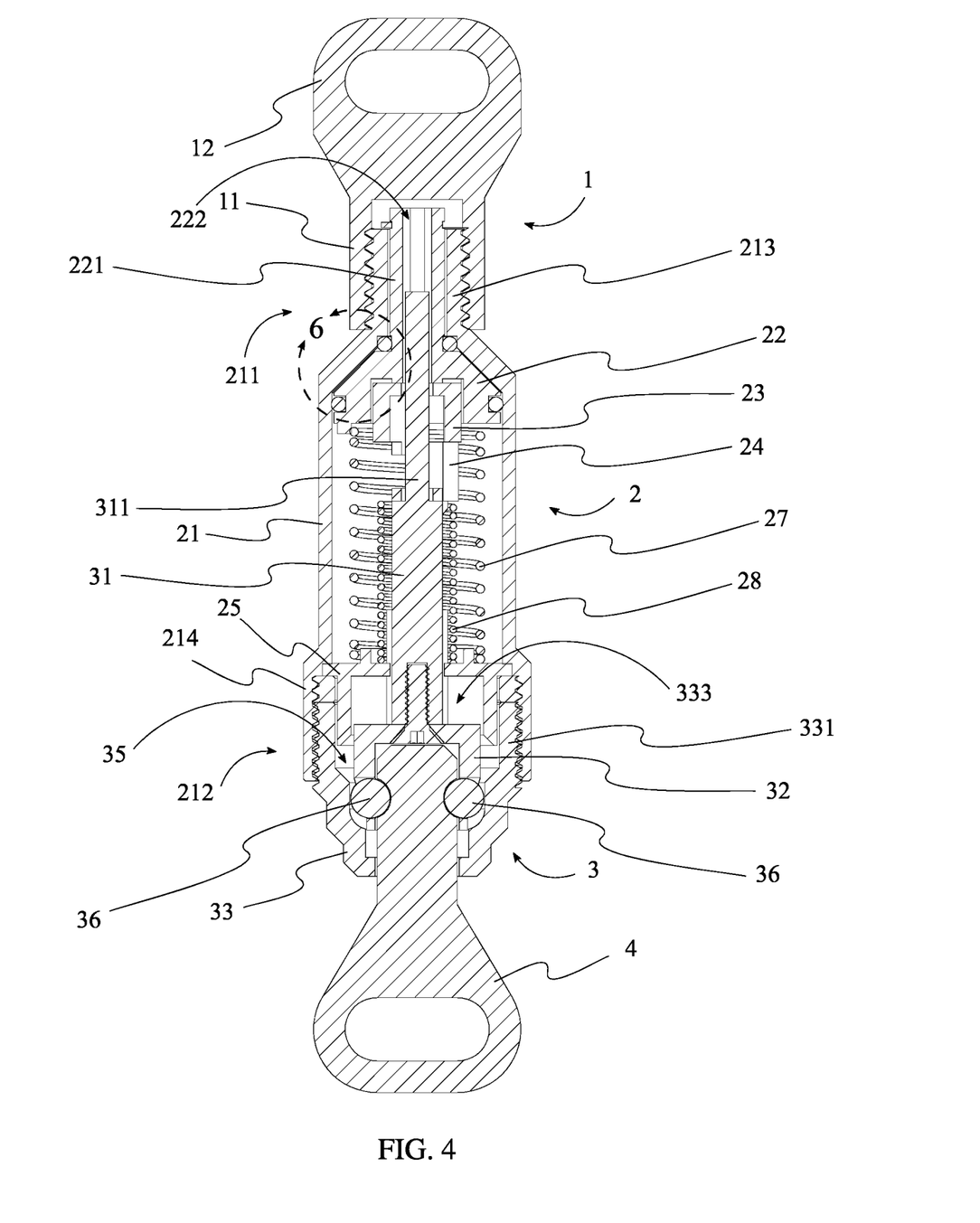
FIG. 4 is a left-side sectional view of the present invention taken along line 4-4 in FIG. 3. In this figure, the present invention is in the set configuration.
Figure 5:
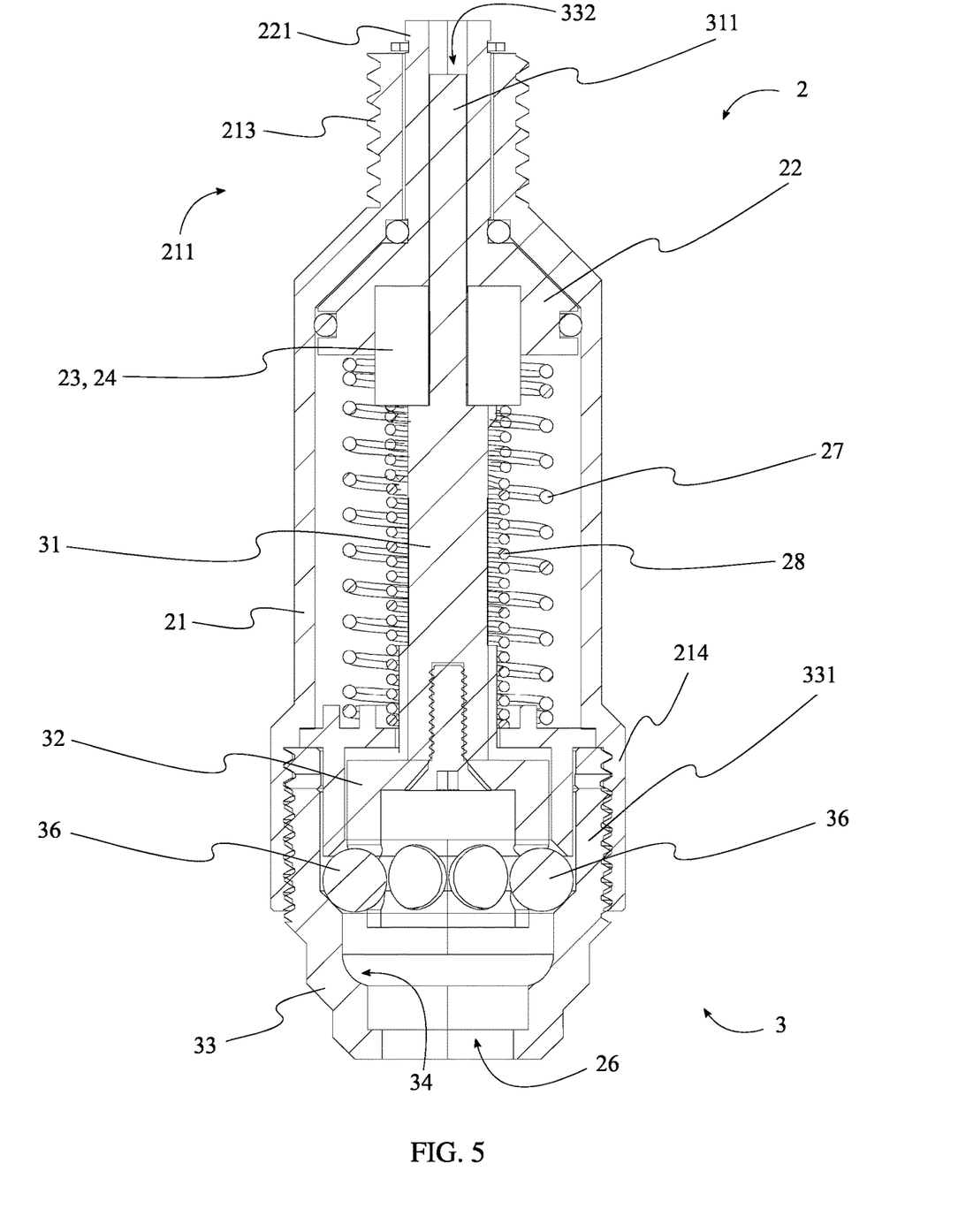
FIG. 5 is a left-side sectional view of the present invention. In this figure, the present invention is in the release configuration. Additionally, the parachute-connection fastener and the catch pin are removed.

Referring to FIG. 4 and FIG. 5, when the user deploys the parachute, tension in the tethers between the user's harness and the parachute pulls the catch pin 4 away from the parachute-connection fastener 1. Thus, transitioning the camlock mechanism 2 into a held configuration. The retention mechanism 3 remains in the set configuration while the camlock mechanism 2 is in the held configuration, and the retention mechanism 3 continues to prevent the catch pin 4 from becoming disconnected from the parachute-connection fastener 1. Further, the tension on the parachute-connection fastener 1 and the catch pin 4 causes components within the camlock mechanism 2 to be forced apart, thus enabling the internal components of the camlock mechanism 2 to rotate and expose a channel that will enable the retention mechanism 3 to exit the set configuration once the external tension is removed.

Figure 8:
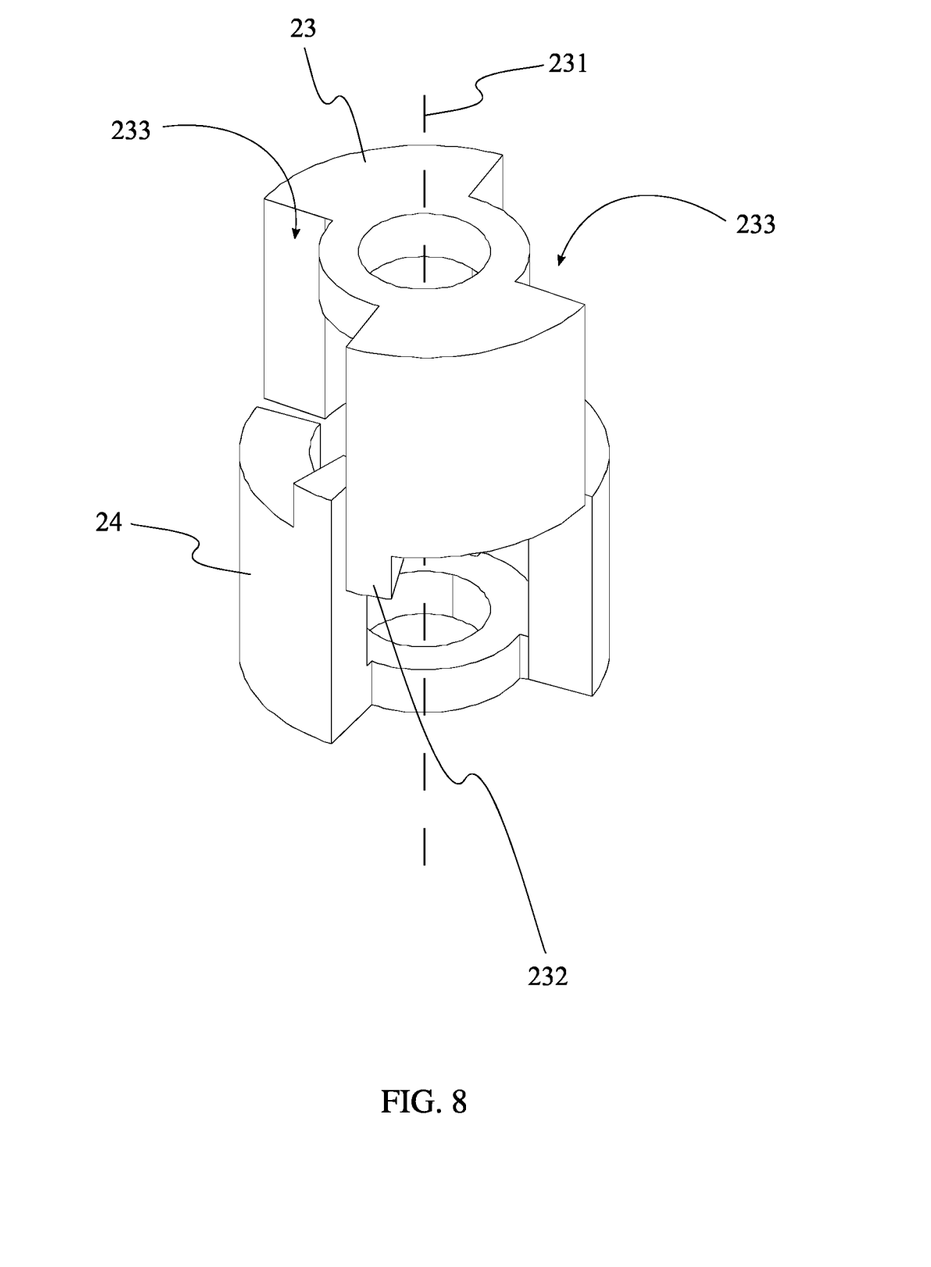
FIG. 8 is a perspective view of the lockset cam and the control cam in a held configuration of the present invention when load is applied.

Referring to FIG. 4, FIG. 5, and FIG. 8, preferably, the camlock mechanism 2 is maintained in the hold configuration until the user lands on the ground. Once the user lands on the ground, the tension on the parachute-connection fastener 1 and the catch pin 4 is released and the retention mechanism 3 is forced back toward the camlock mechanism 2 and the parachute-connection fastener 1. This interaction causes the components of the camlock mechanism 2 to be forced together and enables the retention mechanism 3 to travel a length of the exposed channel, thus moving camlock mechanism 2 and the retention mechanism 3 out of the set configuration and into a release configuration. In the release configuration, once tension is released upon landing, the retention mechanism 3 becomes unclamped from the catch pin 4 and the catch pin 4 is able to be disconnected from the parachute-connection fastener 1. The present invention is then held in the release configuration until the camlock mechanism 2 and the retention mechanism 3 are reset and transitioned into the set configuration.

Referring to FIG. 4 and FIG. 5, the macro level descriptions are facilitated by the components enumerated below. Specifically, the camlock mechanism 2 comprises a camlock shell 21, a cam receptacle 22, a lockset cam 23, a control cam 24, a spring mount 25, an adjustment hole 26, a torsion spring 27, and a shaft spring 28. Additionally, the retention mechanism 3 comprises a cage shaft 31 and a retention cage 32. The camlock shell 21 is a hollow tube used to house the moving components of the camlock mechanism 2. The parachute-connection fastener 1 is mounted adjacent to a first end 211 of the camlock shell 21 so that the present invention can be tethered to the parachute. The cam receptacle 22 is a housing that enables the lockset cam 23 to be held in a desired orientation. As such, the cam receptacle 22 is rotatably mounted adjacent to the first end 211 of the camlock shell 21, opposite to the parachute-connection fastener 1. Additionally, the lockset cam 23 is mounted within the cam receptacle 22. Consequently, the lockset cam 23 is able to rotate when transitioning the camlock mechanism 2 between the set configuration, the held configuration, and the release configuration. Furthermore, as seen in FIG. 8, the lockset cam 23 is operatively coupled to the control cam 24 so that the lockset cam 23 transitions the camlock mechanism 2 between a set configuration and a release configuration by rotating about a longitudinal axis 231 of the lockset cam 23. The lockset cam 23 and the control cam 24 are the above-described components which are forced apart, rotated, and then pressed together when transitioning the present invention between the set configuration and the release configuration. The spring mount 25 is a rigid platform that is mounted adjacent to a second end 212 of the camlock shell 21, opposite to the parachute-connection fastener 1. Thus positioned, the spring mount 25 serves as a divider between the moving components and the camlock mechanism 2 and the catch pin 4.

Referring to FIG. 4 and FIG. 5, the camlock mechanism 2 and the retention mechanism 3 work in concert to clamp onto the catch pin 4 while in the set configuration and the held configuration. Additionally, the camlock mechanism 2 and the retention mechanism 3 work in concert to release the catch pin 4 while in the release configuration. The torsion spring 27 is connected in between the spring mount 25 and the cam receptacle 22 so that the torsion spring 27 is able to rotate the cam receptacle 22 and lockset cam 23 into the release configuration when the control cam 24 is forced away from the lockset cam 23. The adjustment hole 26 normally traverses through the spring mount 25 and the cage shaft 31 is slidably and rotatably engaged within the adjustment hole 26 so that the cage shaft 31 can be slid closer to, or pulled away from, the parachute-connection fastener 1. The control cam 24 is terminally connected to the cage shaft 31. Accordingly, when the cage shaft 31 is pulled away from the parachute connection fastener, as a result of externally applied tension, the control cam 24 is pulled away from the lockset cam 23 and the torsion spring 27 is allowed to rotate the cam receptacle 22 and the lockset cam 23 from the set configuration into the release configuration. Thus, placing the camlock mechanism 2 in the held configuration. The shaft spring 28 is a compression spring that is connected in between the spring mount 25 and the control cam 24.

Preferably, shaft spring 28 is concentrically aligned with the cage shaft 31, such that the shaft spring 28 is positioned around the cage shaft 31. Consequently, the shaft spring 28 becomes compressed when the catch pin 4 is pulled away from the parachute-connection fastener 1. Additionally, the shaft spring 28 provides the force required to push the control cam 24 and the cage shaft 31 toward the parachute-connection fastener 1 once the externally applied tension is removed. The retention cage 32 is a clamping device that remains in a clamped configuration as long as the distance between the cage shaft 31 and the lockset cam 23 is greater than a predefined clamp-release distance. The retention cage 32 is terminally connected to the cage shaft 31, opposite to the movable cam and the spring mount 25 is positioned in between the cage spring and the retention cage 32. Further, the catch pin 4 engages into the retention cage 32 when the retention mechanism 3 is in the set configuration. Thus positioned, the retention cage 32 clamps onto the catch pin 4 while in the set configuration and releases the catch pin 4 when transitioned into the release configuration.

Referring to FIG. 4, the parachute-connection fastener 1 is designed to accommodate connections between the present invention and a wide variety of external structures. To facilitate this, the camlock mechanism 2 comprises a first connection prong 213 and the parachute connection fastener comprises a first connection receptacle 11 and an eyelet 12. The first connection prong 213 and the first connection receptacle 11 are designed to function as corresponding fasteners which enable the parachute-connection fastener 1 to be attached and detached from the camlock mechanism 2. The first connection prong 213 is integrated into the first end 211 of the camlock shell 21 and the first connection prong 213 engages into the first connection receptacle 11. Accordingly, the first connection prong 213 and the first connection receptacle 11 form a detachable coupling that enables the user to access the components within the camlock shell 21 when the parachute-connection fastener 1 is detached from the camlock mechanism 2. The eyelet 12 is mounted adjacent to the first connection receptacle 11 so that the parachute-connection fastener 1 can be attached to the parachute.

Figure 7:
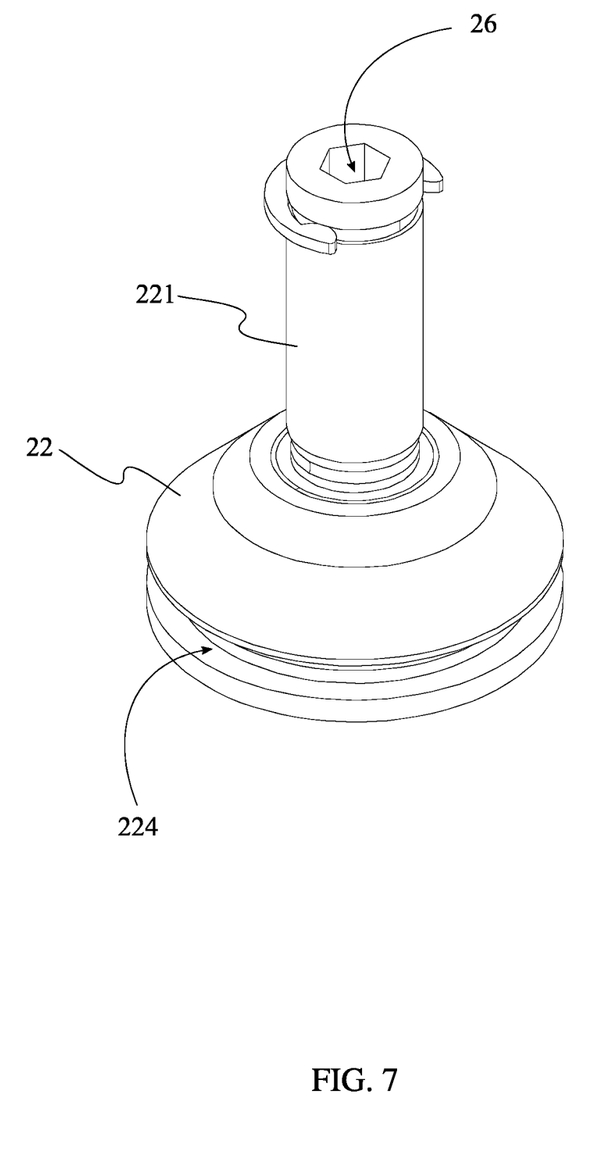
FIG. 7 is a perspective view of the cam receptacle used in the present invention.

Referring to FIG. 4 and FIG. 7, the present invention is designed to be a robust system that can be used multiple times without failure. To facilitate this functionality, the camlock mechanism 2 further comprises an alignment neck 221 and a reset hole 222. Additionally, the retention mechanism 3 further comprises a set rod 311. The cam receptacle 22 is terminally connected to the alignment neck 221. Additionally, the alignment neck 221 extends from the cam receptacle 22 into the first end 211 of the cam shell. Further, the reset hole 222 normally traverses through the cam receptacle 22 and the alignment neck 221. As a result, the alignment neck 221 and the reset hole 222 form a channel through which the user is able to access the components housed within the camlock shell 21. The set rod 311 is terminally connected to the cage shaft 31 and is slidably engaged within the reset hole 222. Preferably, the reset hole 222 is a keyed socket. Accordingly, the user is able to reset the camlock mechanism 2 and the retention mechanism 3 into the set configuration by inserting a tool into the reset hole 222, engaging the tool into the keyed socket, pushing down on the set rod 311, and thereby moving the retention cage 32 away from the cam receptacle 22 and forcing the retention cage 32 to reengage the catch pin 4. The user then rotates the alignment neck 221 and cam receptacle 22 until the control cam 24 is reengaged by the lockset cam 23 and the torsion spring 27 is reloaded.

Figure 6:
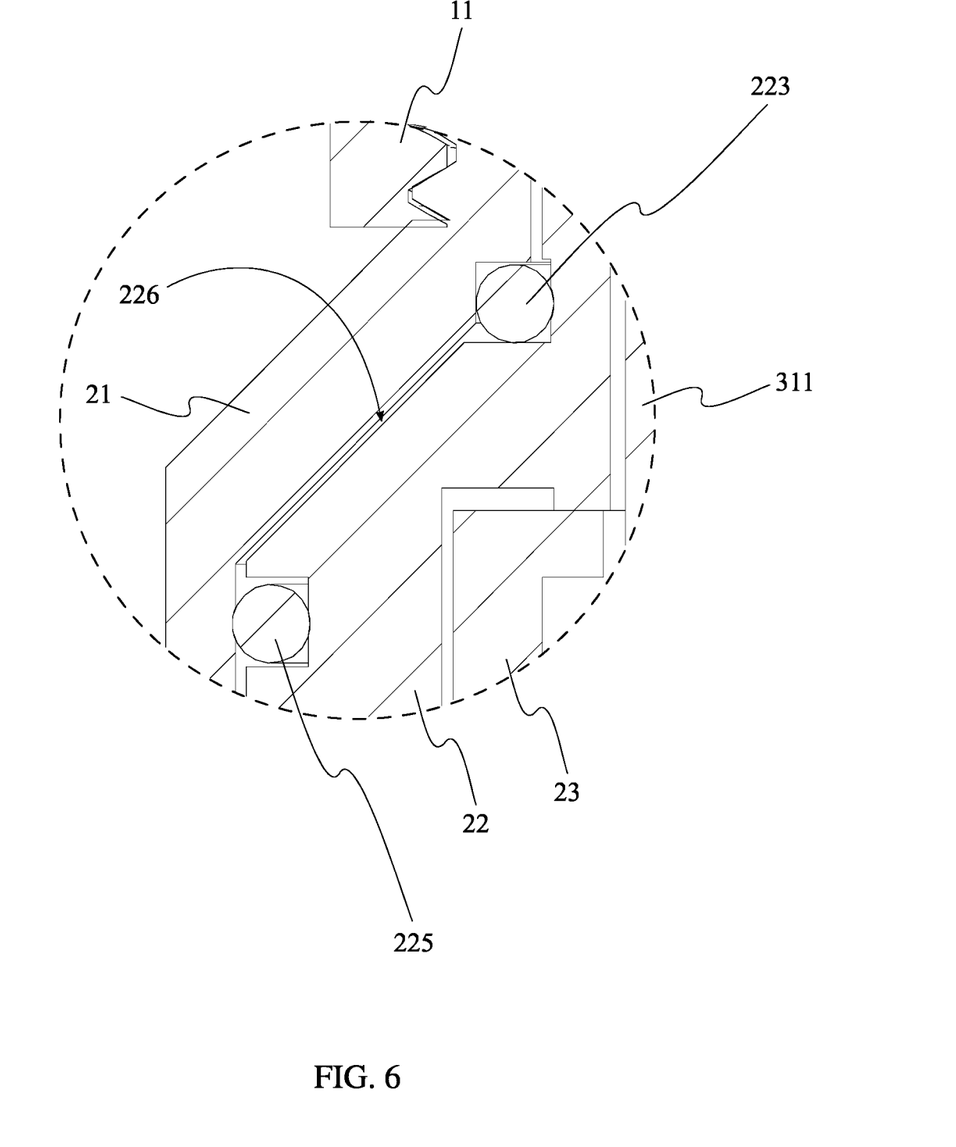
FIG. 6 is a magnified view of area 6 in FIG. 3.

Referring to FIG. 6 and FIG. 7, to further increase reusability, the camlock mechanism 2 further comprises a first O-ring 223, a sealing groove 224, a second O-ring 225, and a quantity of lubricant 226. The first O-ring 223 is mounted around the terminal connection between the alignment neck 221 and the cam receptacle 22. Additionally, the sealing groove 224 laterally traverses around the cam receptacle 22 and is positioned offset from the alignment neck 221, across the cam receptacle 22. Further, the second O-ring 225 being mounted within the sealing groove 224. Thus positioned, the first O-ring 223, the sealing groove 224, and the second O-ring 225 form a watertight chamber that retains the cam receptacle 22 in a desired position while enabling the cam receptacle 22 to rotate without rubbing against the camlock shell 21. The quantity of lubricant 226 is retained between the first O-ring 223 and the second O-ring 225. Consequently, the quantity of lubricant 226 provides a resistance force that controls the rate that the cam receptacle 22 rotates when transitioning from the set configuration into the hold configuration. This attenuated rotation prevents the present invention from transitioning quickly to the release configuration from bouncing or other instability that may occur when the parachute first opens. Preferably, the quantity of lubricant is a high viscosity silicon oil or other suitable compound to slow the rate of rotation of the cam receptacle to allow at least several seconds before the cams align to allow the release configuration position once the load is removed.

Referring to FIG. 4, FIG. 5, and FIG. 8, the control mechanism for the present invention is an automatic system that automatically transitions the camlock mechanism 2 into the held configuration under the externally applied load and then automatically transitions the present invention into the release configuration when the load is removed. To facilitate this, the camlock mechanism 2 further comprises a detent 232 and a release slot 233. The detent 232 is mounted onto the lockset cam 23. Accordingly, the detent 232 acts as a multiway stopper that prevents the control cam 24 from moving the cage shaft 31 into the clamp-release distance while the camlock mechanism 2 is in the set configuration. Additionally, the force exerted by the shaft spring 28 presses the control cam 24 against the detent 232. Thereby, preventing the lockset cam 23 from being angularly displaced while the camlock mechanism 2 is in the set configuration. The release slot 233 traverses into the lockset cam 23 and is angularly offset from the detent 232, about the lockset cam 23. As a result, the release slot 233 functions as the receptacle into which the control cam 24 slides when the present invention is transitioned into the release configuration. Specifically, the release slot 233 is offset from the detent 232, such that the release slot 233 is moved into alignment with the control cam 24 by the torsion spring 27 rotating the cam receptacle 22 and the lockset cam 23 about the longitudinal axis 231 of the lockset cam 23. Additionally, a depth of the release slot 233 is equal to the distance required to move the cage shaft 31 into the clamp-release distance and release the catch pin 4 from the retention mechanism 3.

Referring to FIG. 4, FIG. 5, and FIG. 8, as described above, the present invention transitions between the set configuration and the release configuration. When the camlock mechanism 2 is in the set configuration the torsion spring 27 is placed under a load by the cam receptacle 22 and the control cam 24 is pressed against the detent 232 by the shaft spring 28. Additionally, the control cam 24 prevents angular displacement of the lockset cam 23 and the retention cage 32 prevents linear displacement of the catch pin 4. When the camlock mechanism 2 is in the release configuration, the control cam 24 is pressed into the release slot 233 by the shaft spring 28 and the retention cage 32 enables linear displacement of the catch pin 4.

Referring to FIG. 4 and FIG. 5, the retention mechanism 3 is designed to automatically clamp onto and then automatically release the catch pin 4 when the present invention is transitioned between the set configuration and the release configuration. To facilitate this, the camlock mechanism 2 further comprising a second connection receptacle 214. Additionally, retention mechanism 3 further comprises a retention shell 33, a second connection prong 331, and a release hole 332. The retention shell 33 is a housing for the retention cage 32. The second connection receptacle 214 is integrated into the second end 212 of the camlock shell 21. Additionally, the second connection prong 331 is connected adjacent to the retention shell 33. Further, the second connection prong 331 is engaged within the second connection receptacle 214. As a result, the retention shell 33 functions as a detachable endcap for the camlock shell 21 and protects the moving components of the retention mechanism 3. The release hole 332 traverses through the retention shell 33 and is concentrically aligned with the adjustment hole 26. Additionally, the retention cage 32 is mounted within the retention shell 33 and the catch pin 4 is slidably engaged within the release hole 332. Consequently, the catch pin 4 is able to slide into the retention shell 33 and be engaged by the retention mechanism 3 when transitioning the present invention into the set configuration. Further, the catch pin 4 is able to be ejected from the retention shell 33 when the present invention is transitioned into the release configuration.

Figure 9:
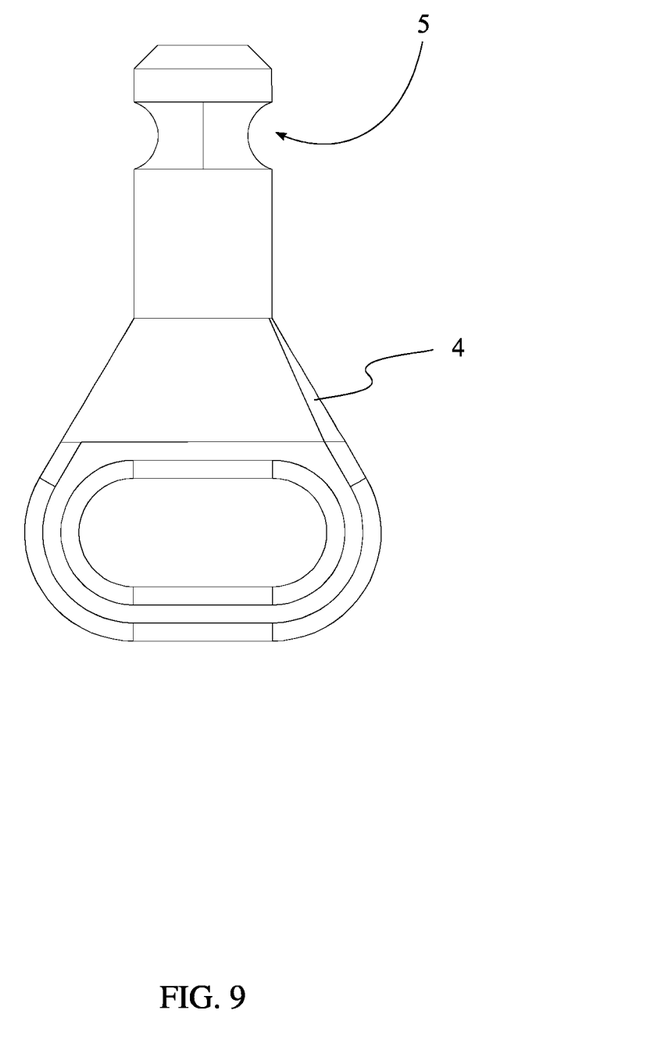
FIG. 9 is a front view of the catch pin used in the present invention.

Referring to FIG. 4, FIG. 5, and FIG. 9 expounding on the components required to retain and release the catch pin 4, the present invention further comprises a locking groove 5. Additionally, the retention mechanism 3 further comprises a locking channel 34, a release groove 35, and a plurality of ball bearings 36. The locking groove 5 laterally traverses around the catch pin 4. Thus, forming a cavity used to retain the catch pin 4 within the retention cage 32 while in the set configuration. The locking channel 34 laterally traverses around an interior compartment 333 of the retention shell 33. Accordingly, the locking channel 34 forms a receptacle that forces the plurality of ball bearings 36 to be pressed into the locking groove 5 when the retention mechanism 3 is in the set configuration. Thereby, preventing the catch pin 4 from sliding out of the release hole 332 until the retention mechanism 3 is transitioned into the release configuration. The release groove 35 laterally traverses around the interior compartment 333 of the retention shell 33 and is positioned in between the locking channel 34 and the spring mount 25. As a result, the release groove 35 forms an area of wider diameter than the locking channel 34 such that the plurality of ball bearings 36 will be slid out of the locking groove 5 and into the release groove 35. Once the plurality of ball bearings 36 is in the release groove 35, the retention mechanism 3 releases the catch pin 4 and the catch pin 4 is able to be ejected from the release hole 332. The plurality of ball bearings 36 is operatively coupled to the retention cage 32, so that the retention cage 32 moves the plurality of ball bearings 36 between the locking channel 34 and the release groove 35 as the present invention is transitioned between the set configuration and the release configuration.

Although the invention has been explained in relation to its preferred embodiment, it is to be understood that many other possible modifications and variations can be made without departing from the spirit and scope of the invention as hereinafter claimed.

What is claimed is:

1. An automatic parachute release device comprising:
a parachute-connection fastener;
a camlock mechanism;
a retention mechanism;
a catch pin;
the camlock mechanism comprising a camlock shell, a cam receptacle, a lockset cam, a control cam, a spring mount, an adjustment hole, a torsion spring, and a shaft spring;
the retention mechanism comprising a cage shaft and a retention cage;
the parachute-connection fastener being mounted adjacent to a first end of the camlock shell;
the cam receptacle being rotatably mounted adjacent to the first end of the camlock shell, opposite to the parachute-connection fastener;
the lockset cam being mounted within the cam receptacle;
the lockset cam being operatively coupled to the control cam, wherein the lockset cam transitions the camlock mechanism between a set configuration and a release configuration by rotating about a longitudinal axis of the lockset cam;
the spring mount being mounted adjacent to a second end of the camlock shell, opposite to the parachute-connection fastener;
the torsion spring being connected in between the spring mount and the cam receptacle;
the adjustment hole normally traversing through the spring mount;
the cage shaft being slidably and rotatably engaged within the adjustment hole;
the control cam being terminally connected to the cage shaft;
the shaft spring being connected in between the spring mount and the control cam;
the retention cage being terminally connected to the cage shaft, opposite to the movable cam;
the spring mount being positioned in between the cage spring and the retention cage; and
the retention pin engaging into the retention cage.

2. The automatic parachute release device as claimed in claim 1 comprising:
the camlock mechanism further comprising a first connection prong;
the parachute connection fastener comprising a first connection receptacle and an eyelet;
the first connection prong being integrated into the first end of the camlock shell;
the first connection prong engaging into the first connection receptacle; and
the eyelet being mounted adjacent to the first connection receptacle.

3. The automatic parachute release device as claimed in claim 1 comprising:
the camlock mechanism further comprising an alignment neck and a reset hole;
the retention mechanism further comprising a set rod;
cam receptacle being terminally connected to the alignment neck;
the alignment neck extending from the cam receptacle into the first end;
the reset hole normally traversing through the cam receptacle and the alignment neck;
the set rod being terminally connected to the cage shaft; and
the set rod being slidably and rotatably engaged within the reset hole.

4. The automatic parachute release device as claimed in claim 3, wherein the reset hole is a keyed socket.

5. The automatic parachute release device as claimed in claim 3 comprising:
the camlock mechanism further comprising a first O-ring, a sealing groove, and a second O-ring;
the first O-ring being mounted around the terminal connection between the alignment neck and the cam receptacle;
the sealing groove laterally traversing around the cam receptacle;
the sealing groove being positioned offset from the alignment neck, across the cam receptacle; and
the second O-ring being mounted within the sealing groove.

6. The automatic parachute release device as claimed in claim 5 comprising:
the camlock mechanism further comprising a quantity of lubricant; and
the quantity of lubricant being retained between the first O-ring and the second O-ring.

7. The automatic parachute release device as claimed in claim 6, wherein the quantity of lubricant is a high viscosity oil.

8. The automatic parachute release device as claimed in claim 1 comprising:
the camlock mechanism further comprising a detent and a release slot;
the detent being mounted onto the lockset cam;
the release slot traversing into the lockset cam; and
the release slot being angularly offset from the detent, about the lockset cam.

9. The automatic parachute release device as claimed in claim 8 comprising:
wherein the camlock mechanism is in the set configuration;
the torsion spring being placed under a load by the cam receptacle;
the control cam being pressed against the detent by the shaft spring;
the control cam preventing angular displacement of the lockset cam; and
the retention cage preventing linear displacement of the catch pin.

10. The automatic parachute release device as claimed in claim 8 comprising:
wherein the camlock mechanism is in the release configuration;
the control cam being pressed into the release slot by the shaft spring; and
the retention cage enabling linear displacement of the catch pin.

11. The automatic parachute release device as claimed in claim 1 comprising:
the camlock mechanism further comprising a second connection receptacle;
the retention mechanism further comprising a retention shell, a second retention prong, and a release hole;
the second connection receptacle being integrated into the second end of the camlock shell;
the second connection prong being connected adjacent to the retention shell;
the second connection prong being engaged within the second connection receptacle;
the release hole traversing through the retention shell;

the release hole being concentrically aligned with the adjustment hole;

the retention cage being mounted within the retention shell; and the catch pin being slidably engaged within the release hole.

12. The automatic parachute release device as claimed in claim 11 comprising:

a locking groove;

the retention mechanism further comprising a locking channel, a release groove, and a plurality of ball bearings;

the locking groove laterally traversing around the catch pin;

the locking channel laterally traversing around an interior compartment of the retention shell;

the release groove laterally traversing around the interior compartment of the retention shell;

the release groove being positioned in between the locking channel and the spring mount; and the plurality of ball bearings being operatively coupled to the retention cage, wherein the retention cage moves the plurality of ball bearings between the locking channel and the release groove.

* * * * *